(12) United States Patent
Yost et al.

(10) Patent No.: US 11,971,421 B2
(45) Date of Patent: Apr. 30, 2024

(54) REMOTE AUTOMATED CHEMICAL CROSSOVER SYSTEM FOR USE WITH AN AUTOMATED SAMPLING DEVICE

(71) Applicant: Elemental Scientific, Inc., Omaha, NE (US)

(72) Inventors: Tyler Yost, Omaha, NE (US); Jonathan Hein, Elkhorn, NE (US); Jae Seok Lee, Burford, GA (US); Dong Cherl Park, Hwasung (KP)

(73) Assignee: Elemental Scientific, Inc., Omaha, NE (US)

( * ) Notice: Subject to any disclaimer, the term of this patent is extended or adjusted under 35 U.S.C. 154(b) by 0 days.

(21) Appl. No.: 18/200,711

(22) Filed: May 23, 2023

(65) Prior Publication Data

US 2023/0375579 A1    Nov. 23, 2023

Related U.S. Application Data

(63) Continuation of application No. 17/036,863, filed on Sep. 29, 2020, now Pat. No. 11,703,518.

(Continued)

(51) Int. Cl.
*G01N 35/00* (2006.01)

(52) U.S. Cl.
CPC . *G01N 35/00613* (2013.01); *G01N 35/00871* (2013.01); *G01N 2035/009* (2013.01)

(58) Field of Classification Search
CPC ....... G01N 35/00613; G01N 35/00871; G01N 2035/009; G01N 35/10; G01N 35/04; G01N 35/00584; G01N 35/1065
See application file for complete search history.

(56) References Cited

U.S. PATENT DOCUMENTS

| | | |
|---|---|---|
| 4,119,120 A | 10/1978 | Mehaffy et al. |
| 2005/0217351 A1 | 10/2005 | Kreck et al. |

(Continued)

FOREIGN PATENT DOCUMENTS

| | | |
|---|---|---|
| JP | 2001272321 A | 10/2001 |
| JP | 2008026187 A | 2/2008 |

(Continued)

OTHER PUBLICATIONS

PCT International Search Report and Written Opinion for PCT/US2020/053282, dated Jan. 18, 2021.

(Continued)

*Primary Examiner* — Jill A Warden
*Assistant Examiner* — John McGuirk
(74) *Attorney, Agent, or Firm* — Kevin E. West; Advent, LLP

(57) ABSTRACT

A sample analysis system is available that can include a remote sampling system, at least one analyzer, and a controller. The remote sampling system can include a plurality of sample sources for providing a corresponding sample therefrom; and a plurality of sample collection devices selectively coupled to any of the plurality of sample sources for receiving at least one of the samples therefrom. The at least one analyzer can be coupled to the plurality of the sample collection devices for receiving at least one of the samples therefrom. The controller can be coupled with the remote sampling system and the at least one analyzer, the controller configured to control which of the sample sources is actively coupled to a given sample collection device at a given time.

13 Claims, 9 Drawing Sheets

Related U.S. Application Data

(60) Provisional application No. 62/909,503, filed on Oct. 2, 2019.

(56) References Cited

U.S. PATENT DOCUMENTS

| | | |
|---|---|---|
| 2011/0146389 A1 | 6/2011 | Wiederin |
| 2013/0146479 A1 | 6/2013 | Brouwer et al. |
| 2016/0305917 A1 | 10/2016 | Diaz et al. |
| 2017/0162457 A1 | 6/2017 | Uhlmeyer et al. |

FOREIGN PATENT DOCUMENTS

| | | |
|---|---|---|
| JP | 2019070638 A | 5/2019 |
| KR | 20180113212 A | 10/2018 |
| WO | 2012145606 A2 | 10/2012 |

OTHER PUBLICATIONS

Office Action for Japanese Patent Application No. 2022-520199, dated Mar. 5, 2024.

US 11,971,421 B2

REMOTE AUTOMATED CHEMICAL CROSSOVER SYSTEM FOR USE WITH AN AUTOMATED SAMPLING DEVICE

BACKGROUND

In many laboratory settings, it is often necessary to analyze a large number of chemical or biological samples at one time. In order to streamline such processes, the manipulation of samples has been mechanized. Such mechanized sampling can be referred to as autosampling and can be performed using an automated sampling device, or autosampler.

Inductively Coupled Plasma (ICP) spectrometry is an analysis technique commonly used for the determination of trace element concentrations and isotope ratios in liquid samples. ICP spectrometry employs electromagnetically generated partially ionized argon plasma which reaches a temperature of approximately 7,000K. When a sample is introduced to the plasma, the high temperature causes sample atoms to become ionized or emit light. Since each chemical element produces a characteristic mass or emission spectrum, measuring the spectra of the emitted mass or light allows the determination of the elemental composition of the original sample.

Sample introduction systems may be employed to introduce the liquid samples into the ICP spectrometry instrumentation (e.g., an Inductively Coupled Plasma Mass Spectrometer (ICP/ICP-MS), an Inductively Coupled Plasma Atomic Emission Spectrometer (ICP-AES), or the like), or other sample detector or analytic instrumentation for analysis. For example, a sample introduction system may withdraw an aliquot of a liquid sample from a container and thereafter transport the aliquot to a nebulizer that converts the aliquot into a polydisperse aerosol suitable for ionization in plasma by the ICP spectrometry instrumentation. The aerosol is then sorted in a spray chamber to remove the larger aerosol particles. Upon leaving the spray chamber, the aerosol is introduced into the plasma by a plasma torch assembly of the ICP-MS or ICP-AES instruments for analysis.

DRAWINGS

The Detailed Description is described with reference to the accompanying figures. Any dimensions included in the accompanying figures are provided by way of example only and are not meant to limit the present disclosure.

DETAILED DESCRIPTION

Overview

Figure 1:
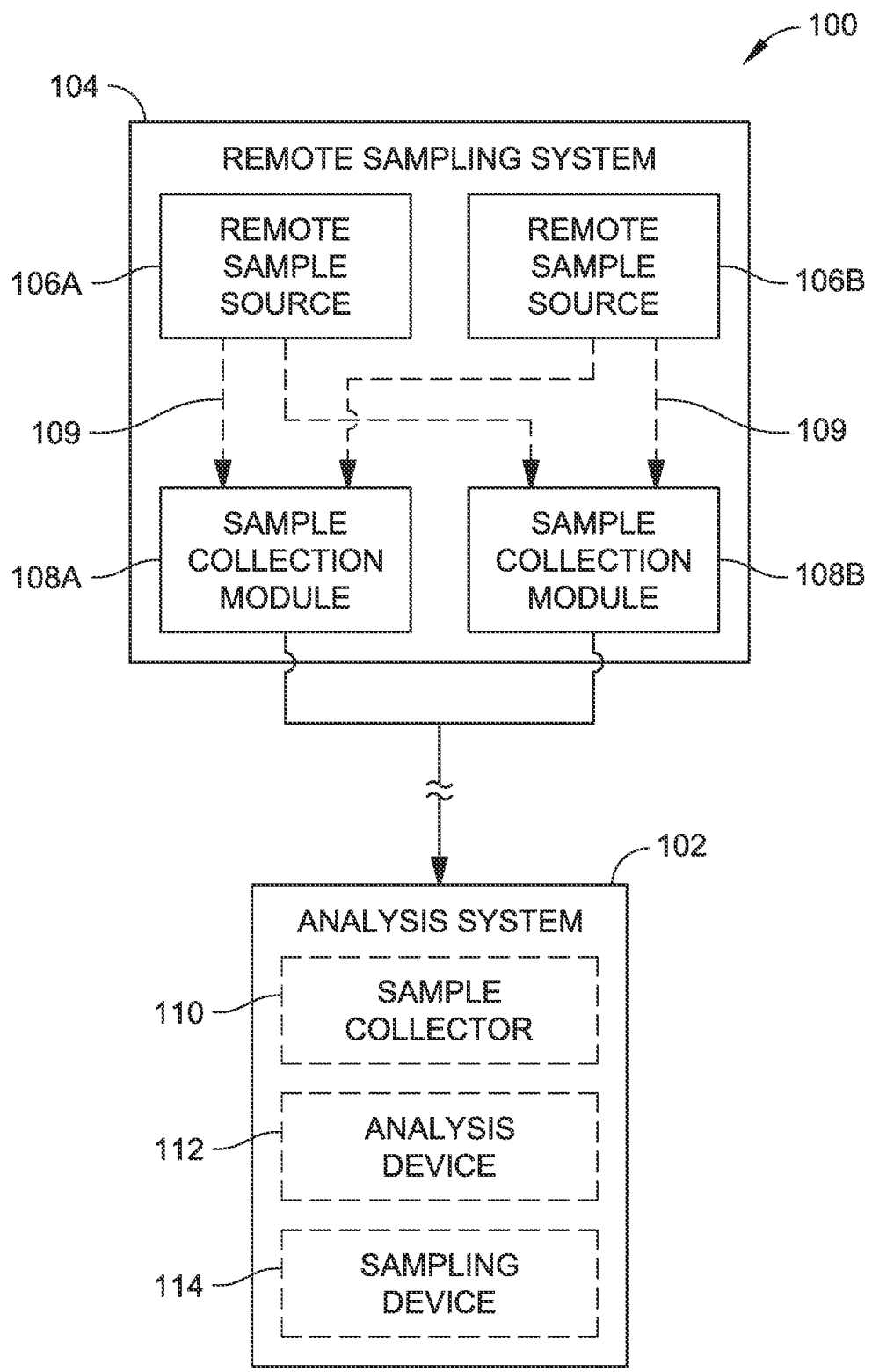
FIG. 1 is a partial line diagram illustrating a system configured to analyze samples transported over long distances and allowing for automated crossover of samples, in accordance with example embodiments of the present disclosure.
Figure 2:
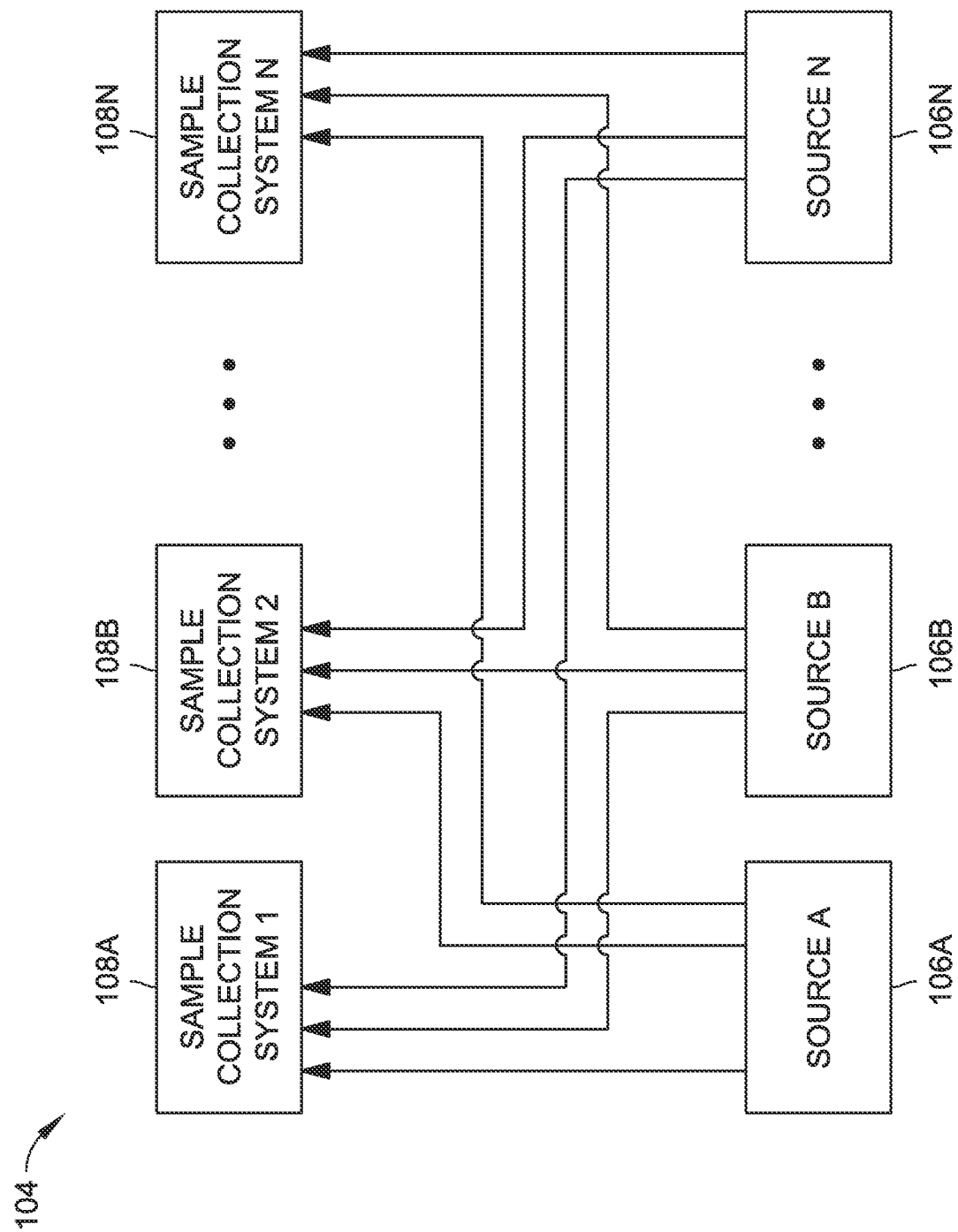
FIG. 2 is a schematic view of a remote sampling system, allowing for automated crossover of up to N samples with respect to N sample collection systems, in accordance with example embodiments of the present disclosure.

Traditionally, remote sampling systems employed as part of ICP spectrometry instrumentation are structured such that a first sample collection system is fluidly connected solely to a first source, a second sample collection system is fluidly connected solely to a second source, and so forth. Such a traditional system can have drawbacks. For example, such a one-to-one delivery system does not facilitate confirming source contamination (e.g., to see if the contamination is originating at the source or at the collection system). Additionally, if a given collection system is not operational, for example, for maintenance or another reason, the testing of the material from that related source is also likely stopped as well, until that line can be brought back to operational status.

The present remote sampling system facilitates the selective connection (e.g., via electronically or manually controlled valves) of any of a plurality of sample sources to more than one sample collection system. As such, the present remote sampling system allows for the switching of chemical sources between remote sampling collection devices or modules. That is, the present remote sampling system can be controlled in a manner to determine which chemical source is actively coupled (e.g., via valve control) to a given sample collection device at a given time, thereby allowing the chosen chemical to flow to the given sample collection device. In an embodiment, a ratio of fluids from multiple chemical sources may be permitted to flow to a given sample collection module to permit testing of a mixture of such source materials. In an embodiment, each sample collection system can further be selectively connected to one or more analyzers or monitoring units, with flow to the one or more analyzers or monitoring units selectively controlled.

The present remote sampling system thus allows for switching of chemical sources between remote sampling modules. Such an arrangement permits for source contamination verification (e.g., see if the contamination is coming from a given source or a particular remote sampling module). This arrangement also facilitates system redundancy, allowing a source material to be directed to a different sampling collection system or module if, for example, the sampling collection system or module to which the source material had previously been directed is down for maintenance or another reason. In one implementation, a plurality of sample collection systems are connected to a plurality of analyzers or central analysis systems, thus, for example, allowing a single connection point between a given sample source and the remote sampling system with the ability to connect to multiple analyzers (e.g., based upon which remote sampling module a given source material is directed to).

Example Implementations

Referring generally to FIGS. 1 through 6C, example systems are described to automatically transfer samples inline over long distances to analysis systems configured to analyze the samples. In example embodiments, one or more samples can be analyzed by multiple analysis systems, where such analysis systems can comprise differing analysis techniques. A system 100 (e.g., an autosampler in conjunction with a spectrometry device) includes at least one analysis system 102 at a first location. The system 100 can also include two or more remote sampling systems 104 at one or more locations remote from the first location (e.g., a second location). For instance, the two or more remote sampling systems 104 can be positioned proximate a plurality of sources of chemicals, such as a chemical storage tank, a chemical treatment tank (e.g., a chemical bath), a chemical transport line or pipe, or the like (e.g., remote from the first location of the analysis system 102), such as a remote sample source 106A and a remote sample source 106B shown in FIG. 1 and remote sample sources A-N 106A-106N (e.g., sources A-N) shown in FIG. 2. Chemicals from such sources 106A-106N can be analyzed by the analysis system 102, where the analysis system 102 can be positioned remote from the remote sampling system(s) 104, such as an analysis hub for a production facility (e.g., the first location). In implementations, the remote sampling system 104 can include two or more sample collection devices 108A-108N to use in conjunction with the two or more remote sample sources 106A-106N. In an embodiment, the same number of sample collection devices 108 can be used as the number of remote sample sources 106. In an embodiment, the number of sample collection devices 108 is different from the number of remote sample sources 106.

The system 100 can also include one or more remote sampling system(s) 104 at a third location, a fourth location, and so forth, where the third location and/or the fourth location are remote from the first location. In implementations, the third location, the fourth location, and other locations of the remote sampling systems 104 can be remote from respective other locations of other remote sampling systems 104. For example, one remote sampling system 104 can be positioned at a water line (e.g., a deionized water transport line), whereas one or more other remote sampling systems 104 can be positioned at a location with two or more chemical storage tanks, chemical treatment tanks (e.g., a chemical baths), chemical transport lines or pipes, or the like. In some embodiments, the system 100 also may include one or more remote sampling system(s) 104 at the first location (e.g., proximate to the analysis system 102). For example, a sampling system 104 at the first location may include an autosampler coupled with the analysis system 102. The one or more sampling systems 104 can be operable to receive samples from the first location, the second location, the third location, the fourth location, and so forth, and the system 100 can be operable to deliver the samples to the analysis system 102 for analysis. The system 100 can include components, such as pumps, valves, tubing, sensors, etc., suitable for acquiring a sample from a given sample source 106A-106N, transferring the sample to a chosen sample collection module 108A-108N, and delivering the sample over the distance to the analysis system 102.

A remote sampling system 104 according to the present embodiment can be configured to selectably provide a sample from one of a plurality of remote sample sources 106A-106N to one of a plurality of sample collection modules 108A-108N and prepare the one or more samples for delivery (e.g., to the analysis system 102) and/or analysis. The present remote sampling system 104 thus allows for switching of chemical sources 106A-106N between a corresponding set of remote sampling modules 108A-108N. In FIG. 1, for example, respective source-to-module fluid connections 109 provide the fluid flow paths between the remote sample sources 106A-106B and the sample collection modules 108A-108B and are shown in dashed line configuration to schematically indicate the selective flow between such units (i.e., all flow paths are available but are not necessarily used, which may be accomplished through the use of valving, to be discussed later). In embodiments, the remote sampling system 104 can be disposed various distances from the analysis system 102 (e.g., 1 m, 5 m, 10 m, 30 m, 50 m, 100 m, 300 m, 1000 m, etc.).

The remote sampling device 104 can include a device (e.g., as part of a given sample collection module 108) configured for collecting a sample from a sample stream or source 106A-106N (e.g., a liquid, such as waste water, rinse water, chemical, industrial chemical, etc., a gas, such as an air sample and/or contaminants therein to be contacted with a liquid, or the like). The remote sampling system 104 can include components, such as pumps, valves, tubing, sensors, etc., suitable for acquiring the sample from the sample source and delivering the sample over the distance to the analysis system 102. A given sample collection module 108 may further be configured to prepare a collected sample using a diluent, an internal standard, a carrier, etc., such as to provide particular sample concentrations, spiked samples, calibration curves, or the like, and may be configured to rinse with a rinse solution (e.g., deionized water).

The analysis system 102 is fluidly coupled with the remote sampling system 104 and may include, for example, a sample collector 110, an analysis device 112, and/or a sampling device 114. The sample collector 110 can be configured to collect a sample from one or more of the sample collection modules 108A-108N of a given remote sampling systems 104 for conveyance to an analysis device 112 and/or a sampling device 114. The analysis system 102 may include a sampling device 114 configured to collect a sample that is local to the analysis system 102 (e.g., a local autosampler) and, for example, to deliver that local sample to the analysis device 112.

The analysis system 102 can include at least one analysis device 112 configured to analyze samples to determine, for example, trace element concentrations, isotope ratios, and so forth (e.g., in liquid samples). For example, the analysis device 112 can include ICP spectrometry instrumentation including, but not limited to, an Inductively Coupled Plasma Mass Spectrometer (ICP/ICP-MS), an Inductively Coupled Plasma Atomic Emission Spectrometer (ICP-AES), an Inductively Coupled Plasma Optical Emission Spectrometer (ICPOES), or the like. In embodiments, the analysis system 102 includes a plurality of analysis devices 112 (i.e., more than one analysis device). For example, the system 100 and/or the analysis system 102 can include multiple sampling loops, with each sampling loop introducing a portion of the sample to the plurality of analysis devices 112. As another example, the system 100 and/or the analysis system 102 can be configured with a multi-position valve, such that a single sample can be rapidly and serially introduced to the plurality of analysis devices 112. In embodiments, a given analysis device 112 can be, but is not limited to, an ICPMS (e.g., for trace metal determinations), ICPOES (e.g., for trace metal determinations), ion chromatograph (e.g., for anion and cation determinations), liquid chromatograph (LC) (e.g., for organic contaminants determinations), Fourier-transform Infrared Spectroscopy (FTIR infrared) (e.g., for chemical composition and structural information determinations), particle counter (e.g., for detection of undissolved particles), moisture analyzer (e.g., for detection of water in samples), gas chromatograph (GC) (e.g., for detection of volatile components), or the like. In embodiments, a given analysis device or analyzer 112 can be located remotely from the remote sampling system 104. In an embodiment, a given analysis device 112 may be local to a given remote sampling system 104. It is to be understood that the ability to perform a chemical crossover or switch can be utilized in a system 100 where the analysis system 102 is local to the sampling system 104, as well as in a case where such components are remote to one another.

It is to be understood that at least one analyzer 112 can be coupled to at least one of the plurality of the sample collection devices 108A-108N for receiving at least one of the samples therefrom, with each respective sample collection device 108A-108N connected to at least one corresponding analyzer 112. In an embodiment, multiple sample collection devices 108A-108N or a number less than N can be fluidly connected to one given analyzer 112. In an embodiment, each respective sample collection device 108A-108N may have a sole analyzer 112 to which it corresponds. In an embodiment, a first plurality of sample collection systems 108 can be dedicated to a first analyzer 112, a second distinct plurality of sample collection systems 108 can be dedicated to a second distinct analyzer 112, and so on.

The system 100 and/or analysis system 102 can be configured to report analyte concentration at a location over time. In some embodiments, the analysis device 112 may be configured to detect one or more trace metals in a sample. In other embodiments, the analysis device 112 may be configured for ion chromatography. For example, ions and/or cations can be collected in a sample and delivered to a chromatograph analysis device 112. In further embodiments, organic molecules, proteins, and so on, can be collected in samples and delivered to a high-resolution time-of-flight (HR-ToF) mass spectrometer analysis device 112 (e.g., using a nebulizer (not shown)). Thus, systems as described herein can be used for various applications, including, but not necessarily limited to: pharmaceutical applications (e.g., with a central mass spectrometer analysis device connected to multiple pharmaceutical reactors), waste monitoring of one or more waste streams, semiconductor fabrication facilities, and so forth. For example, a waste stream may be continuously monitored for contaminants and diverted to a tank when a contaminant is detected. As another example, one or more chemical streams can be continuously monitored via analysis of the samples obtained by one or more of the remote sampling systems 104 linked to the analysis system 102, whereby a contamination limit can be set for each of the chemical streams. Upon detection of a contaminant exceeding the contamination limit for a particular stream, the system 100 can provide an alert.

The remote sampling system 104 can be configured to selectively couple with a gas supply (not shown) and can be configured to transport gas from the second location (and possibly the third location, the fourth location, and so forth) to the first location. In this manner, liquid sample segments supplied by the remote sampling system 104 can be collected in a gas stream and transported to the location of the analysis system 102 using gas pressure sample transfer. In some embodiments, the gas collection stream can include an inert gas, including, but not necessarily limited to: nitrogen gas, argon gas, and so forth.

Figure 3A:
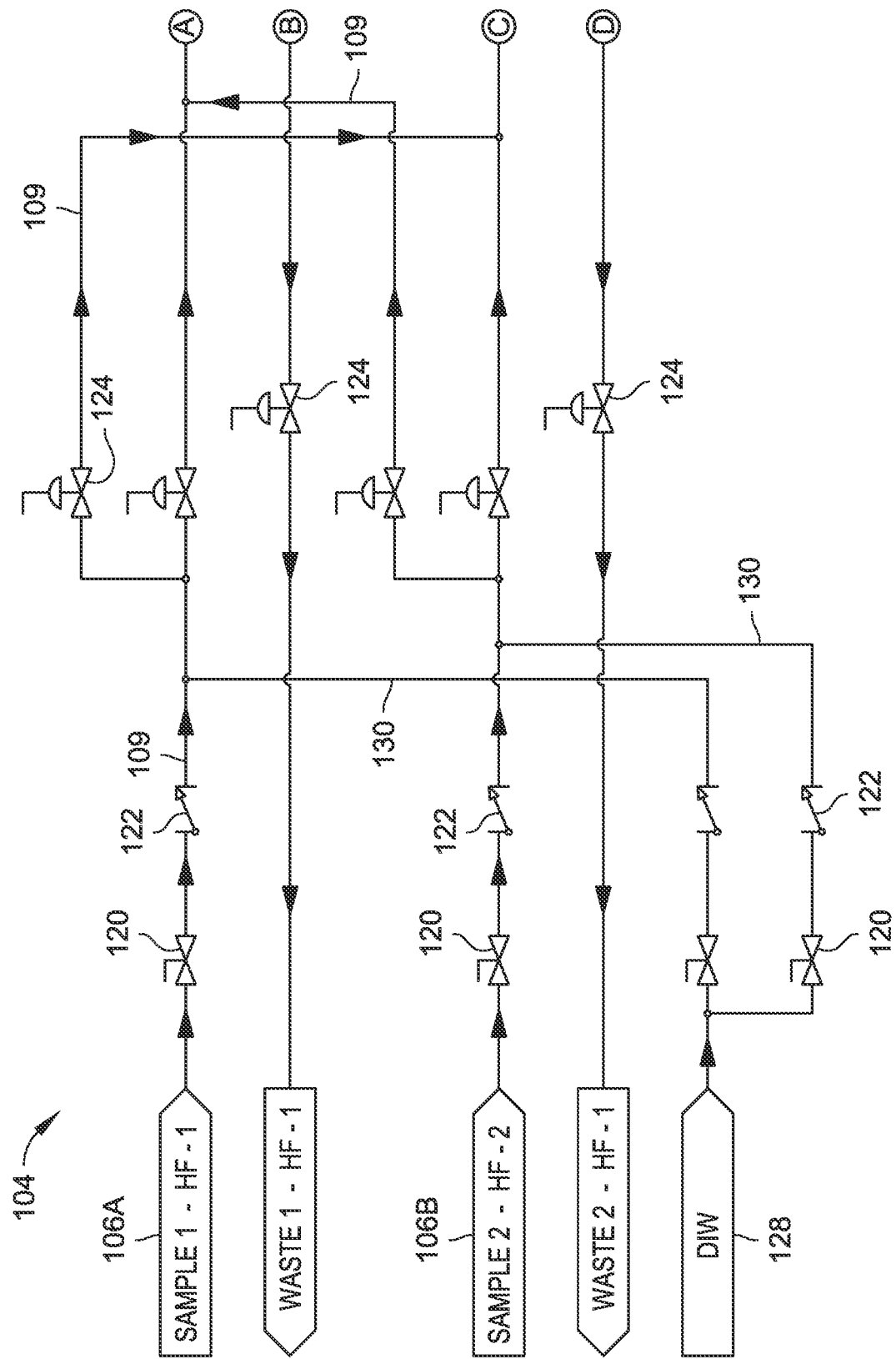
FIG. 3A is an environmental view illustrating a remote sampling device used in a remote sampling system, facilitating a crossover of a pair of samples, in accordance with example embodiments of the present disclosure.
Figure 3B:
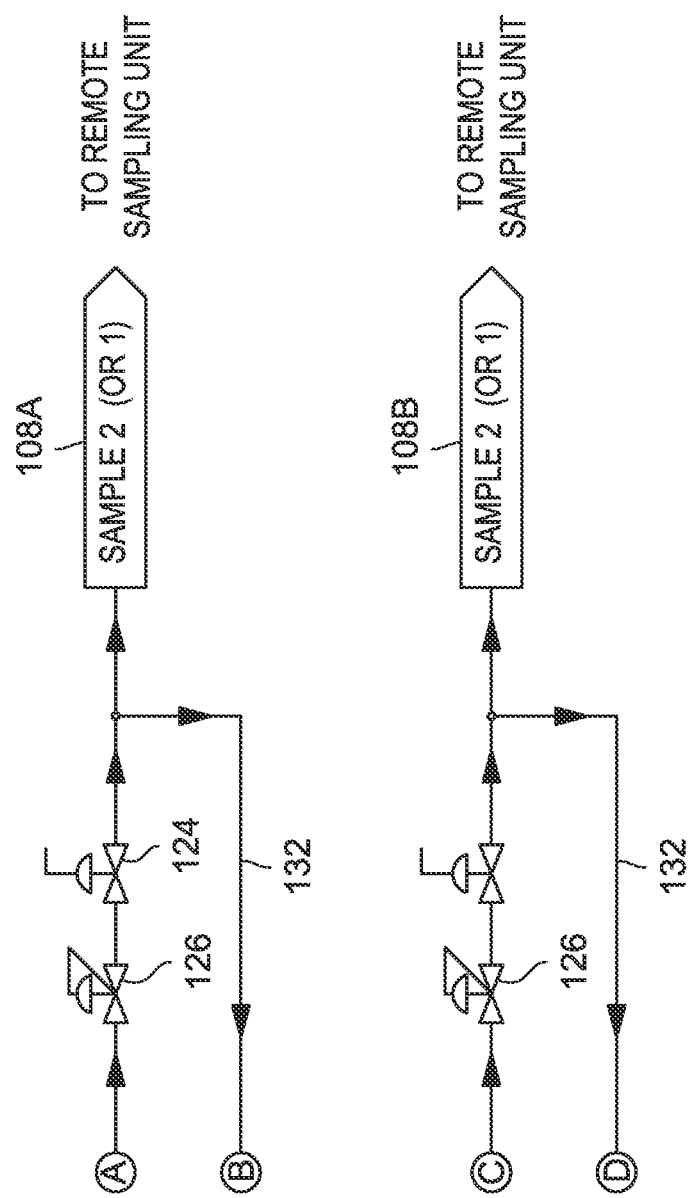
FIG. 3B is another environmental view illustrating a remote sampling device used in a remote sampling system, facilitating a crossover of a pair of samples, in accordance with example embodiments of the present disclosure.
Figure 4:
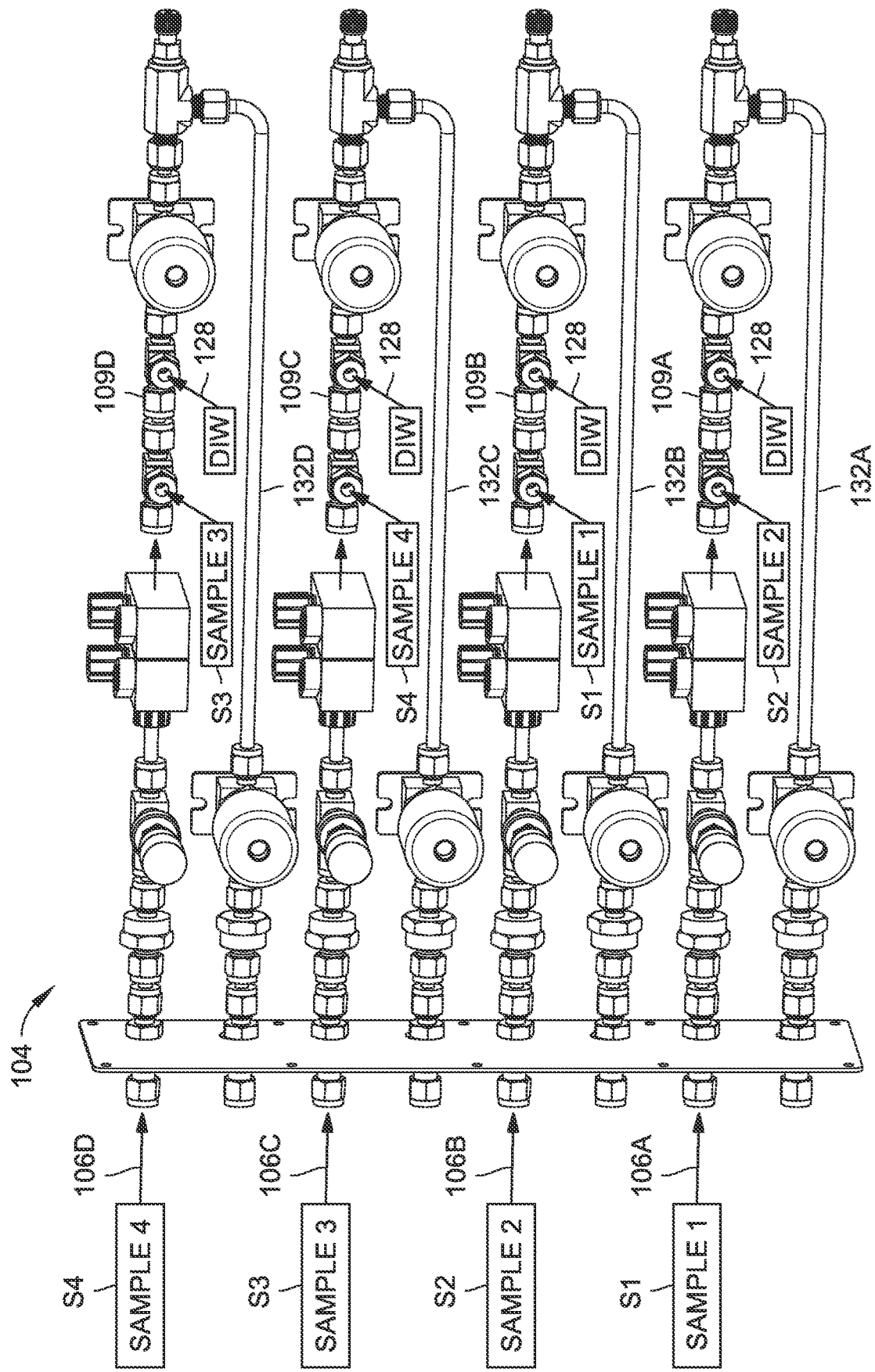
FIG. 4 is an environmental view illustrating a remote sampling device used in a remote sampling system, facilitating a crossover of two distinct pairs of samples, in accordance with example embodiments of the present disclosure.

The example embodiments illustrated in FIGS. 3A-3B and 4 illustrate further details of how the different sample sources 106A-106N may be particularly linked in providing a flow stream to a given set of sample collection modules 108A-108N. With respect to FIGS. 3A-3B, remote sample sources 106A and 106B can be interconnected via source-to-module fluid connections 109 to permit a selectable flow of a given sample to a corresponding sample collection module or sampling unit 108A, 108B. The source-to-module fluid connections 109 may comprise fluid lines or other plumbing, along with one or more manual valves 120, check valves 122, pneumatic valves 124, and/or pressure regulators 126, to achieve the desired regulated flow therethrough.

A water source 128 (e.g., supplying deionized water (DIW) or another form of water) can be fluidly coupled with a corresponding source-to-module fluid connection 109 via respective water lines 130. Such water lines 130 may carry, for example, one or more manual valves 120 and/or check valves 122 to facilitate the control of water therethrough and into a desired source-to-module fluid connection 109. In an embodiment, a corresponding manual valve 120 is used to control a water flush (e.g., with DIW) of a given source-to-module fluid connection 109. In some embodiments, other types of valves (e.g., pneumatic valves 124) may be provided within a given water line 130, for example, to facilitate electronic control thereof. The water source 128 may be used to help flush or otherwise rinse a given source-to-module fluid connection 109 and/or to serve to dilute a given sample.

A given source-to-module fluid connection 109 can further have a waste flow line 132 coupled thereto through which flow from the source-to-module fluid connection 109 may be directed. For example, the waste flow line 132 may be provided with at least one pneumatic valve 124 and/or another type of valve to permit selective flow of fluid therethrough (e.g., to a waste location). In an embodiment, a pneumatic valve 124 associated with a given waste flow line 132 may be opened during a DIW flush of a corresponding source-to-module fluid connection 109.

The pneumatic valves 124 may have various features associated therewith. In an embodiment, all the pneumatic valves 124 are normally closed (NC) unless expressly activated and opened. In an embodiment, the pneumatic valves 124 are independently controlled by a controller and are configured to permit chemical selection in the system 100. In an embodiment, when the system 100 is powered off and/or an emergency event occurs, the pneumatic valves 124 are to automatically close. In an embodiment where multiple remote sample collection modules 108 exist, a given set of pneumatic valves 124 may correspond to a respective sample collection module 108 to control which source material (e.g., chemical) is to be delivered by that given sample collection module 108. In an embodiment, all the pneumatic valves 124 are independently controlled. In an embodiment, such as that illustrated in FIGS. 3A-3B, with the chemical switching and DIW flush options, there is a maximum of two sample points in a given remote sampling system.

The embodiment illustrated in FIG. 4 provides for a first pair of source-to-module fluid connections 109A and 109B dedicated to deliver a first sample S1 and/or a second sample S2 and a second pair of source-to-module fluid connections 109C and 109D dedicated to deliver a third sample S3 and/or a fourth sample S4, as part of a remote sampling system 104. The embodiment of FIG. 4 is configured to selectively provide a flow of water (e.g., DIW) into each of the source-to-module fluid connections 109A-109D. Also, each of the source-to-module fluid connections 109A-109D is fluidly coupled with a corresponding waste flow line 132A-132D. The embodiment of FIG. 4, like the embodiment of FIG. 3, can include components, such as pumps, valves, tubing, sensors, etc., suitable for acquiring the sample S1-S4 from their corresponding sample sources 106A-106D and delivering the sample S1-S4 toward a given sample collection module 108A-108D (not expressly illustrated in FIG. 4).

The system 100 can be implemented as an enclosed sampling system, where the gas and samples in the source-to-module fluid connections 109 (e.g., sample transfer line) are not exposed to the surrounding environment. For example, a housing and/or a sheath (not shown) can enclose one or more components of the system 100. In some embodiments, one or more sample lines of the remote sampling system 104 may be cleaned between sample deliveries. Further, one or more of the source-to-module fluid connections 109 may be cleaned (e.g., using a cleaning solution) between samples.

Figure 5:
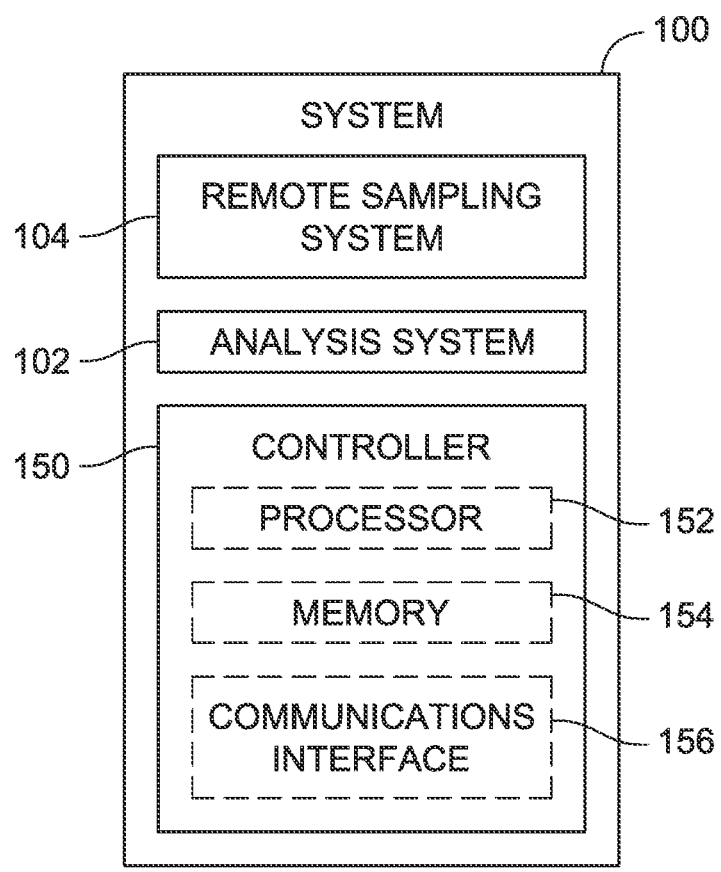
FIG. 5 is a schematic view of a system incorporating a remote sampling device, an analysis system, and a controller, in accordance with example embodiments of the present disclosure.

With respect to FIG. 5, the system 100, including some or all of its components, can operate under computer control via a controller 150. The controller 150 may include a processor 152, a memory 154, and/or a communications interface 156. For instance, one or more components of the system, such as the analysis system 102, remote sampling system 104, valves (e.g., the pneumatic valves 124), pumps, and/or detectors can be coupled with a controller 150 for controlling the collection, delivery, and/or analysis of samples (e.g., S1-S4, as shown in FIG. 4). For example, the controller 150 can be configured to switch one pneumatic valve 124, located within a given source-to-module fluid connection 109, to selectively choose which sample is to flow therethrough and/or another pneumatic valve 124, located in the same line 109 or in a corresponding waste line 132, to determine whether the flow therethrough is to be directed to a corresponding sample collection module or sampling unit 108 or through the corresponding waste line 132. The details of the controller 150 and its components will be discussed in greater detail in the below section entitled "Control Systems."

Figure 6A:
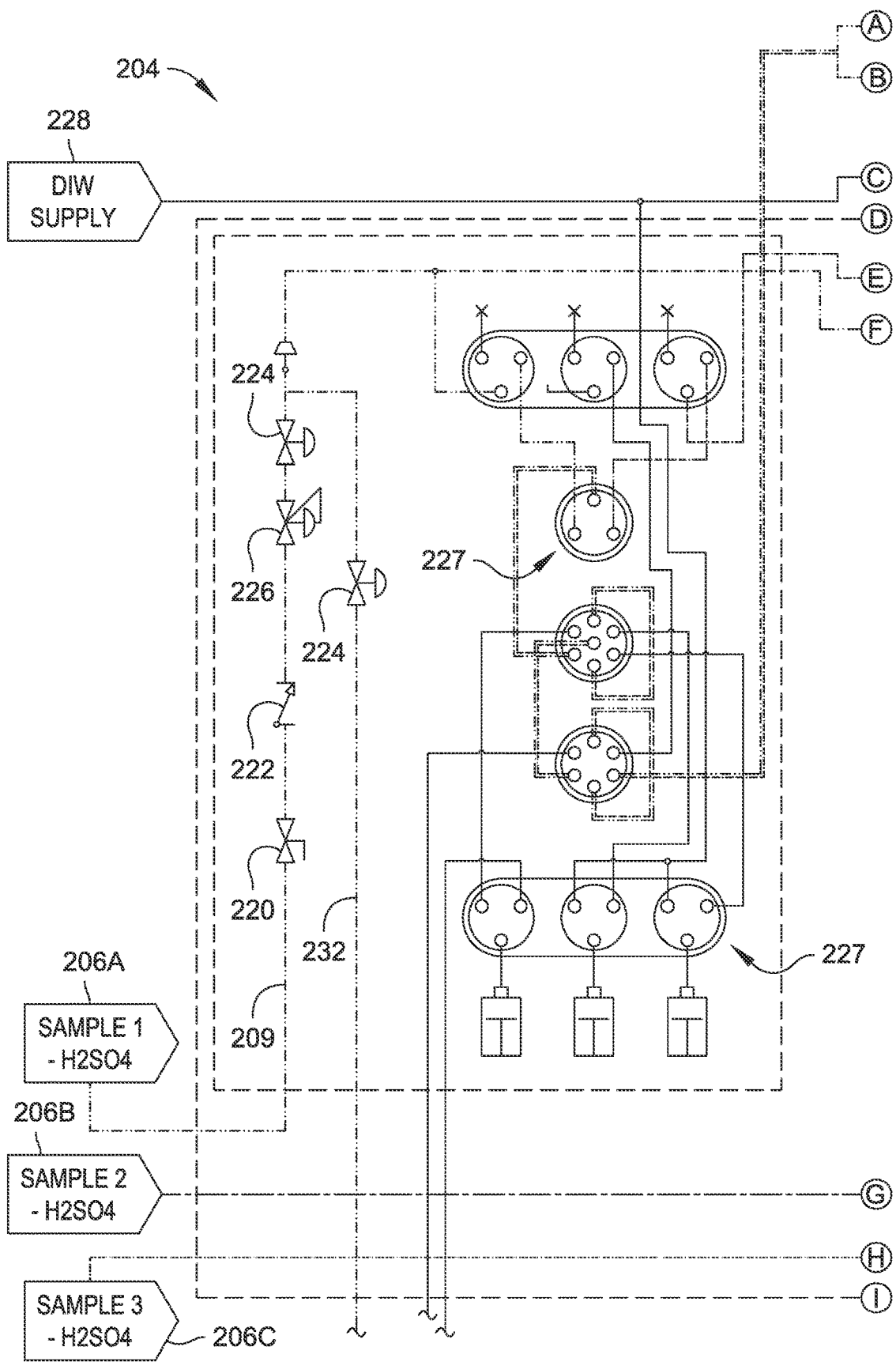
FIG. 6A is an environmental view illustrating a remote sampling device used in a remote sampling system, facilitating a crossover of a pair of samples from three distinct samples, in accordance with example embodiments of the present disclosure.
Figure 6B:
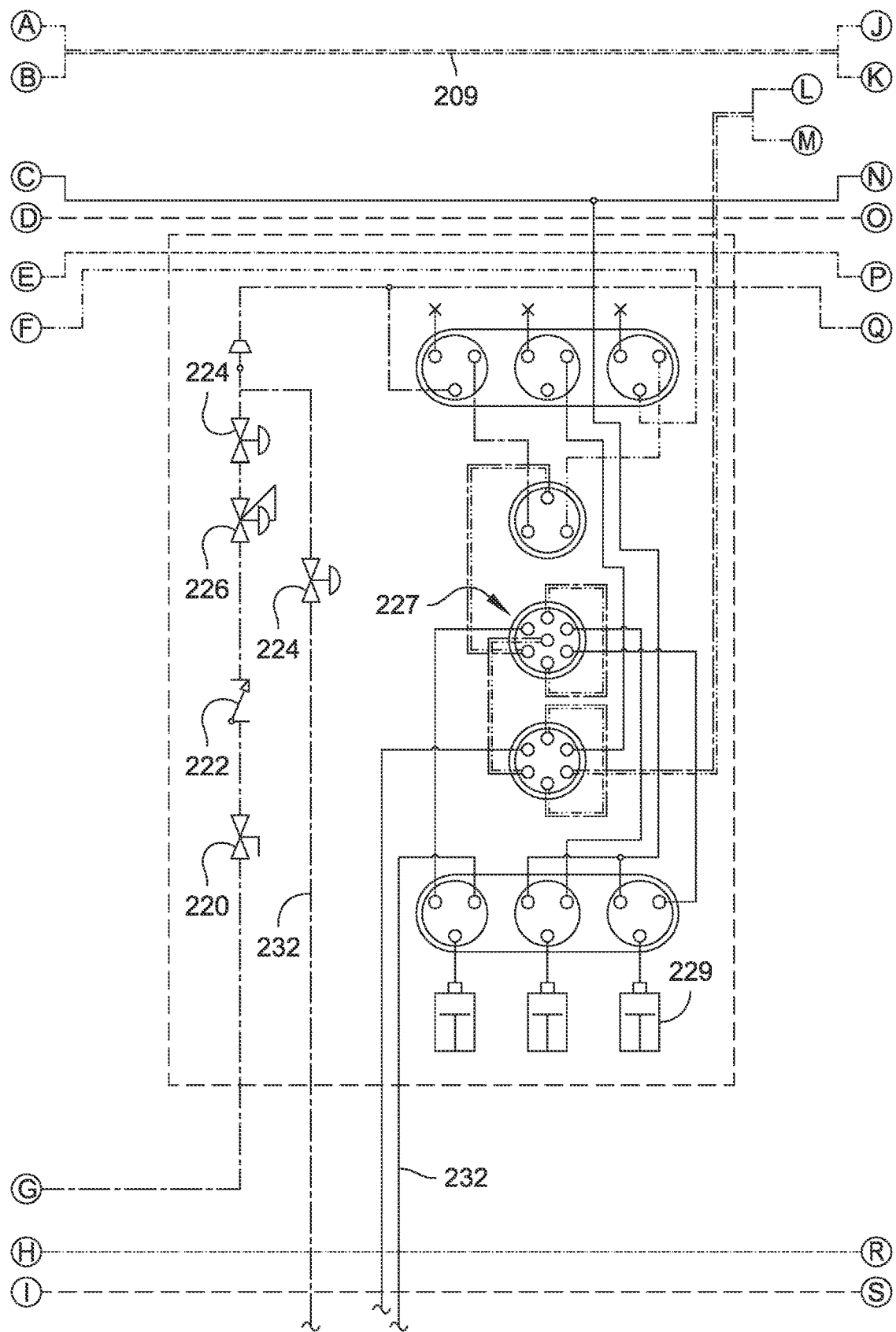
FIG. 6B is another environmental view illustrating a remote sampling device used in a remote sampling system, facilitating a crossover of a pair of samples from three distinct samples, in accordance with example embodiments of the present disclosure.
Figure 6C:
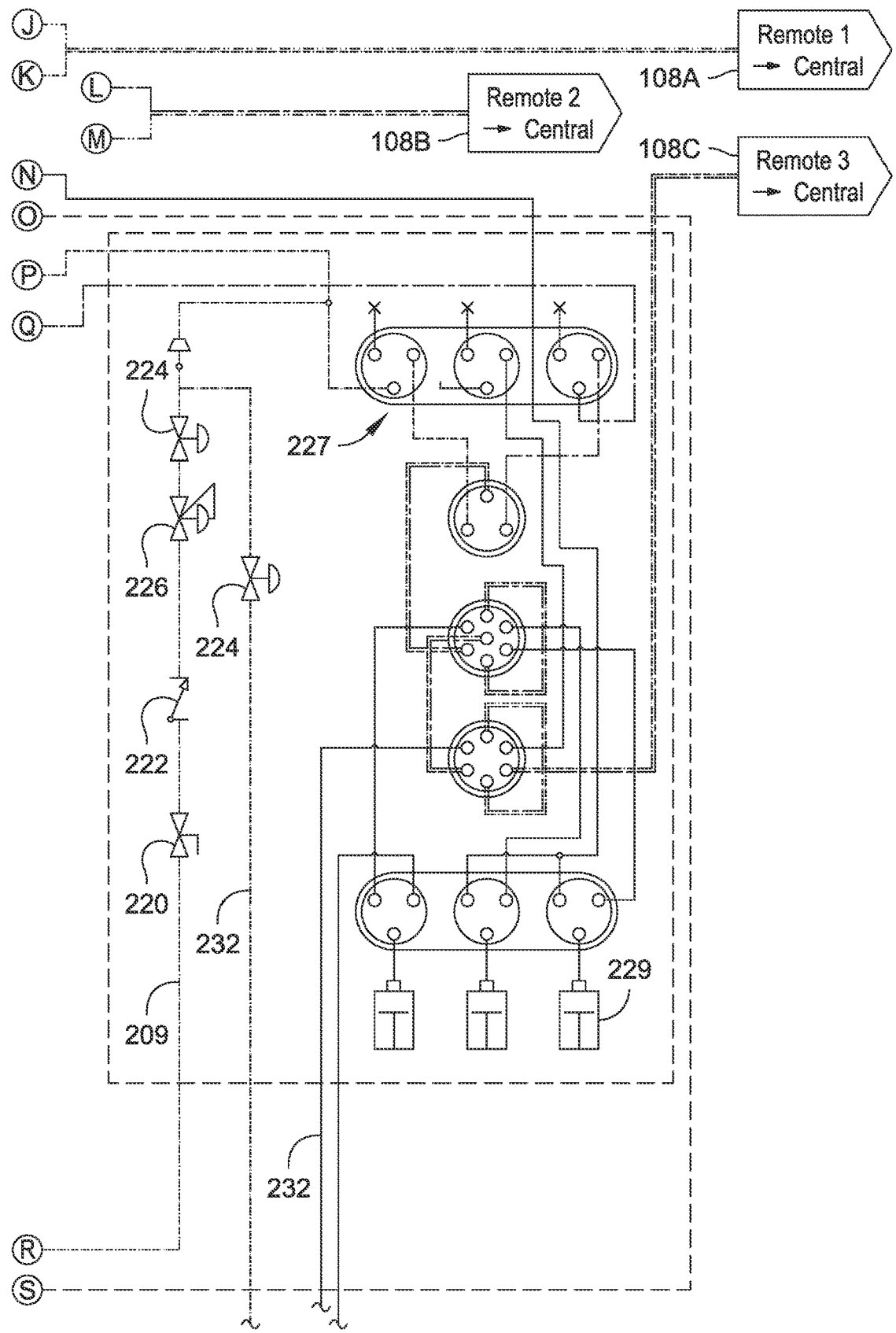
FIG. 6C is another environmental view illustrating a remote sampling device used in a remote sampling system, facilitating a crossover of a pair of samples from three distinct samples, in accordance with example embodiments of the present disclosure.

A remote sampling system 204 shown in FIGS. 6A-6C is similar to the remote sampling system 104 in functionality and components, except where described herein. The remote sampling system 204 generally illustrates how the different sample sources 206A-206C may be particularly linked in providing a selectable flow stream to a given set of sample collection modules 108A-108C. With respect to FIGS. 6A-6C, remote sample sources 206A-206C can be interconnected via source-to-module fluid connections 209 to permit a selectable flow of a given sample to a corresponding sample collection module or sampling unit 108A-108C. The source-to-module fluid connections 209 may comprise fluid lines or other plumbing, along with one or more manual valves 220, check valves 222, pneumatic valves 224, pressure regulators 226, and/or multi-port valves 227, to achieve the desired regulated flow therethrough, along with a plurality of syringes 229 to facilitate the introduction other components (e.g., diluents, etc.) into the flow as desired. A water source 228 (e.g., supplying deionized water (DIW) or another form of water) be fluidly coupled with a corresponding source-to-module fluid connection 209 via respective water lines 230. Such water lines 230 may carry, for example, one or more manual valves 220 and/or check valves 222 to facilitate the control of water therethrough and into a desired source-to-module fluid connection 209. A given source-to-module fluid connection 209 can further have a waste flow line 232 coupled thereto through which flow from the source-to-module fluid connection 209 may be directed. For example, the waste flow line 232 may be provided with at least one pneumatic valve 224 and/or another type of valve to permit selective flow of fluid therethrough (e.g., to a waste location). Parts associated with the remote sampling system 204 that are similarly numbered as those associated with the remote sampling system 104 (e.g., fluid connections 109 and 209) can be expected have similar construction and/or function, unless otherwise described herein.

There are some areas where the remote sampling system 204 can differ from the remote sampling system 104. One is in the use of a plurality of multi-port valves 227 to facilitate the selective flow of samples and/or other components through the various fluid connections 209. The use of multi-port valves 227 permits the use of a variety suitable plumbing options (e.g., valves, manifolds, etc.) in the system 104 to yield a selectable flow (e.g., of desired samples) to any of the sample collection modules 108A-108C. Such multi-port valves 227 may have any number of ports associated therewith (e.g., 3, 4, 5, 6, 7, etc.), to achieve the desired inputs and/or outputs at a given valve location. Also, as illustrated, a combination of multi-port valves 227 can be used at a given location to achieve the desired flow functionality. It is to be understood that the controller 150 may be used to control the operation of remote sampling system 204 (e.g., selective flow through the respective multi-port valves 227). Another difference is in the use of syringes 229 to facilitate the selectable introduction other components (e.g., diluents, etc.) into the flow as desired. Finally, FIGS. 6A-6C illustrate the various waste flow lines 232 being fluidly interconnected, which can aid in the management of the waste line flow (e.g., to recycling, disposal, etc.). It is to be understood, however, that distinct waste flow lines 232 could instead be used and still be within the scope of the present disclosure. Furthermore, it is to be understood that elements shown in the embodiments in FIGS. 3A-3B, 4, and 6 may be mixed and matched, as may be appropriate, and such combinations are considered within the scope of the present disclosure.

Control Systems

A system 100, including some or all of its components, can operate under computer control via a controller 150. The controller 150 may include a processor 152, a memory 154, and/or a communications interface 156. For example, a processor 152 can be included with or in a system 100 to control the components and functions of systems described herein using software, firmware, hardware (e.g., fixed logic circuitry), manual processing, or a combination thereof. The terms "controller," "functionality," "service," and "logic" as used herein generally represent software, firmware, hardware, or a combination of software, firmware, or hardware in conjunction with controlling the systems. In the case of a software implementation, the module, functionality, or logic represents program code that performs specified tasks when executed on a processor (e.g., central processing unit (CPU) or CPUs). The program code can be stored in one or more computer-readable memory devices (e.g., internal memory and/or one or more tangible media), and so on. The structures, functions, approaches, and techniques described herein can be implemented on a variety of commercial computing platforms having a variety of processors.

In some embodiments, the controller 150 is communicatively coupled with an indicator at a remote location, such as the second location, and provides an indication (e.g., an alert) at the second location when insufficient sample is received at the first location. The indication can be used to initiate (e.g., automatically) additional sample collection and delivery. In some embodiments, the indicator provides an alert to an operator (e.g., via one or more indicator lights, via a display readout, a combination thereof, etc.). Further, the indication can be timed and/or initiated based upon a one or more predetermined conditions (e.g., only when multiple samples have been missed). In some embodiments, an indicator can also be activated based upon conditions measured at a remote sampling site. For instance, a detector at the second location can be used to determine when a sample is being provided within a remote sampling system 104, and the indicator can be activated when sample is not being collected.

The processor 152 associated with the controller 150 provides processing functionality for the controller 150 and can include any number of processors, micro-controllers, or other processing systems, and resident or external memory for storing data and other information accessed or generated by the controller 150. The processor 152 can execute one or more software programs that implement techniques described herein. The processor 152 is not limited by the materials from which it is formed or the processing mechanisms employed therein and, as such, can be implemented via semiconductor(s) and/or transistors (e.g., using electronic integrated circuit (IC) components), and so forth.

The memory 154 of the controller 150 is an example of tangible, computer-readable storage medium that provides storage functionality to store various data associated with operation of the controller 150, such as software programs and/or code segments, or other data to instruct the processor 152, and possibly other components of the controller 150, to perform the functionality described herein. Thus, the memory 154 can store data, such as a program of instructions for operating the system 100 (including its components), and so forth. It should be noted that while a single memory is described, a wide variety of types and combinations of memory (e.g., tangible, non-transitory memory) can be employed. The memory 154 can be integral with the processor 152, can comprise stand-alone memory, or can be a combination of both.

The memory 154 can include, but is not necessarily limited to: removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In implementations, the system 100 and/or the memory 122 can include removable integrated circuit card (ICC) memory, such as memory 122 provided by a subscriber identity module (SIM) card, a universal subscriber identity module (USIM) card, a universal integrated circuit card (UICC), and so on.

The communications interface 156 of the controller 150 is operatively configured to communicate with components of the system. For example, the communications interface 156 can be configured to transmit data for storage in the system 100, retrieve data from storage in the system 100, and so forth. The communications interface 156 is also communicatively coupled with the processor 152 to facilitate data transfer between components of the system 100 and the processor 152 (e.g., for communicating inputs to the processor 152 received from a device communicatively coupled with the controller 150). It should be noted that while the communications interface 156 is described as a component of a controller 150, one or more components of the communications interface 156 can be implemented as external components communicatively coupled to the system 100 via a wired and/or wireless connection. The system 100 can also comprise and/or connect to one or more input/output (I/O) devices (e.g., via the communications interface 156), including, but not necessarily limited to: a display, a mouse, a touchpad, a keyboard, and so on.

The communications interface 156 and/or the processor 152 can be configured to communicate with a variety of different networks, including, but not necessarily limited to: a wide-area cellular telephone network, such as a 3G cellular network, a 4G cellular network, or a global system for mobile communications (GSM) network; a wireless computer communications network, such as a Wi-Fi network (e.g., a wireless local area network (WLAN) operated using IEEE 802.11 network standards); an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to limit the present disclosure. Further, the communications interface 156 can be configured to communicate with a single network or multiple networks across different access points.

A method is also described for detecting contamination of a sample in a remote sampling system. In implementations, the remote sampling system 104 draws a sample from the remote sample sources 106A-106N via the sample collection devices 108A-108N. In some implementations, the sample collection devices 108A-108N can be selectively fluidically coupled to any of the sample sources 106A-106N for receiving one or more samples therefrom. The sample is directed through a first fluid connection path (e.g., a first source-to-fluid connection 109) to the analysis system 102. The analysis system 102 detects whether a contaminant is present in the sample. Upon detecting that a contaminant is present, the sample is redirected from the corresponding sample source 106A-106N through a second remote sampling system and a second fluid connection path (e.g., a second source-to-fluid connection 109) to the analysis system 102. The analysis system 102 then detects whether the contaminant is present in the sample received through the second connection path. In some implementations, the analysis system 102 compares the levels of the contaminant to determine if the sample is contaminated, or the first remote sampling system is contaminated. In some implementations, the analysis system 102 determines whether the contaminant exceeds a predetermined level. When the contaminant exceeds the predetermined level, the sample is redirected through the second connection path. In some implementations, an alert is generated when the detected contaminant exceeds the predetermined level. In some implementations, the system 100 operates via controller 150 to control the collection, delivery, and/or analysis of samples. For example, controller 150 is operable to selectively direct the sample through the fluid connection paths.

CONCLUSION

In implementations, a variety of analytical devices can make use of the structures, techniques, approaches, and so on described herein. Thus, although systems are described herein, a variety of analytical instruments may make use of the described techniques, approaches, structures, and so on. These devices may be configured with limited functionality (e.g., thin devices) or with robust functionality (e.g., thick devices). Thus, a device's functionality may relate to the device's software or hardware resources, e.g., processing power, memory (e.g., data storage capability), analytical ability, and so on.

Generally, any of the functions described herein can be implemented using hardware (e.g., fixed logic circuitry such as integrated circuits), software, firmware, manual processing, or a combination thereof. Thus, the blocks discussed in the above disclosure generally represent hardware (e.g., fixed logic circuitry such as integrated circuits), software, firmware, or a combination thereof. In the instance of a hardware configuration, the various blocks discussed in the above disclosure may be implemented as integrated circuits along with other functionality. Such integrated circuits may include all of the functions of a given block, system, or circuit, or a portion of the functions of the block, system, or circuit. Further, elements of the blocks, systems, or circuits may be implemented across multiple integrated circuits. Such integrated circuits may comprise various integrated circuits, including, but not necessarily limited to: a monolithic integrated circuit, a flip chip integrated circuit, a multichip module integrated circuit, and/or a mixed signal integrated circuit. In the instance of a software implementation, the various blocks discussed in the above disclosure represent executable instructions (e.g., program code) that perform specified tasks when executed on a processor. These executable instructions can be stored in one or more tangible computer readable media. In some such instances, the entire system, block, or circuit may be implemented using its software or firmware equivalent. In other instances, one part of a given system, block, or circuit may be implemented in software or firmware, while other parts are implemented in hardware.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A method for detecting contamination of a sample in a remote sampling system, comprising:
   drawing the sample from one of a plurality of sample sources via one of a plurality of sample collection devices, the plurality of sample collection devices being selectively fluidically coupled to any of the plurality of sample sources for receiving the sample therefrom;
   directing the sample from the one of the plurality of sample collection devices through one of a plurality of connection paths to at least one analyzer;
   in a first detection step, detecting, via the at least one analyzer, whether a contaminant is present in the sample;
   based upon the detection of a contaminant present in the sample, redirecting the sample from the corresponding one of the plurality of sample sources through a second of the plurality of sample collection devices and a second of the plurality of connection paths to the at least one analyzer; and
   in a second detection step, detecting, via the at least one analyzer, whether the contaminant is present in the sample received through the second of the plurality of connection paths.

2. The method of claim 1, further comprising determining during at least one of the first detection step and the second detection step, via the at least one analyzer, if the detected contaminant exceeds a predetermined level.

3. The method of claim 2, further comprising generating an alert upon determining that the detected contaminant exceeds the predetermined level.

4. The method of claim 2, wherein upon determining that the detected contaminant does not exceed the predetermined level in the first detection step, the sample is not redirected.

5. A method for detecting contamination of a sample in a remote sampling system, comprising:
   drawing a first sample from one of a plurality of sample sources via a first sample collection device of a plurality of sample collection devices, the plurality of sample collection devices being selectively fluidically coupled to any of the plurality of sample sources for receiving the sample therefrom;
   directing the first sample from the first sample collection device through a first connection path to at least one analyzer;
   detecting, via the at least one analyzer, whether a contaminant is present in the first sample;
   based upon the detection of a contaminant present in the first sample, drawing a second sample from the same one of the plurality of sample sources via a second sample collection device of the plurality of sample collection devices and directing the second sample through a second connection path to the at least one analyzer; and
   detecting, via the at least one analyzer, whether the contaminant is present in the second sample.

6. The method of claim 5, further comprising determining, via the at least one analyzer, if the detected contaminant in one or more of the first sample and the second sample exceeds a predetermined level.

7. The method of claim 6, further comprising generating an alert upon determining that the detected contaminant exceeds the predetermined level.

8. The method of claim 5, wherein a same analyzer is utilized to detect whether the contaminant is present in each of the first sample and the second sample.

9. The method of claim 5, further comprising detecting, via the at least one analyzer, a level of the contaminant present in the first sample.

10. The method of claim 9, further comprising detecting, via the at least one analyzer, a level of the contaminant present in the second sample.

11. The method of claim 10, further comprising comparing the level of the contaminant present in the first sample to the level of the contaminant present in the second sample.

12. The method of claim 11, further comprising determining whether the sample source for the first sample and the second sample is contaminated based on the comparison between the level of the contaminant present in the first sample to the level of the contaminant present in the second sample.

13. The method of claim 11, further comprising determining whether the first sample collection device is contaminated based on the comparison between the level of the contaminant present in the first sample to the level of the contaminant present in the second sample.

\* \* \* \* \*